United States Patent [19]

Qualitz et al.

[11] 4,379,721

[45] Apr. 12, 1983

[54] PRESSURE SENSITIVE RECORDING MATERIALS

[75] Inventors: Marion Qualitz, Hilden; Viktor A. Krupp, Düsseldorf, both of Fed. Rep. of Germany

[73] Assignee: Spezial-Papiermaschinenfabrik August Alfred Krupp GmbH & Co., Hilden, Fed. Rep. of Germany

[21] Appl. No.: 241,523

[22] Filed: Mar. 9, 1981

[30] Foreign Application Priority Data

Mar. 14, 1980 [DE] Fed. Rep. of Germany ....... 3009754
Mar. 14, 1980 [DE] Fed. Rep. of Germany ....... 3009806

[51] Int. Cl.$^3$ ................ C09D 11/00
[52] U.S. Cl. ................ 106/21; 282/27.5
[58] Field of Search ................ 106/21; 282/27.5; 427/150, 151, 152

[56] References Cited

U.S. PATENT DOCUMENTS

| | | | |
|---|---|---|---|
| 3,244,549 | 5/1966 | Farnham et al. | 117/36.2 |
| 3,244,550 | 5/1966 | Farnham et al. | 117/36.2 |
| 3,244,728 | 4/1966 | Johnson et al. | 260/336 |
| 3,336,337 | 8/1967 | Gosnell | 260/343.4 |
| 3,466,184 | 9/1969 | Bowler et al. | 117/36.2 |
| 3,622,364 | 11/1971 | Sugahara | 106/288 B |
| 3,663,256 | 5/1972 | Miller et al. | 117/36.2 |
| 3,682,680 | 8/1972 | Hayashi et al. | 117/36.2 |
| 3,816,838 | 6/1974 | Higaki et al. | 346/1 |
| 3,856,553 | 12/1974 | Hayashai et al. | 117/36.2 |
| 3,894,168 | 7/1975 | Brockett et al. | 428/514 |
| 3,900,217 | 8/1975 | Hayashi et al. | 282/27.5 |
| 3,916,070 | 10/1975 | Ozutsumi et al. | 428/411 |
| 3,932,695 | 1/1976 | Davis et al. | 428/531 |
| 3,968,301 | 7/1976 | Sears | 428/323 |
| 3,983,292 | 9/1976 | Saito et al. | 428/306 |
| 4,028,118 | 6/1977 | Nakasuji et al. | 106/21 |
| 4,063,754 | 12/1977 | Shackle et al. | 282/27.5 |
| 4,069,353 | 1/1978 | Matsukawa et al. | 427/57 |
| 4,090,619 | 5/1978 | Higuchi et al. | 214/16 R |
| 4,094,687 | 6/1978 | Lawton | 106/21 |
| 4,112,138 | 9/1978 | Davis et al. | 427/401 |
| 4,187,365 | 2/1980 | Zecher et al. | 528/45 |

FOREIGN PATENT DOCUMENTS

| | | |
|---|---|---|
| 1511277 | 7/1969 | Fed. Rep. of Germany . |
| 2153043 | 4/1972 | Fed. Rep. of Germany . |
| 2119467 | 10/1972 | Fed. Rep. of Germany . |
| 789396 | 1/1958 | United Kingdom . |
| 1042596 | 9/1966 | United Kingdom . |
| 1090866 | 11/1967 | United Kingdom . |
| 1215618 | 12/1970 | United Kingdom . |
| 1232208 | 5/1971 | United Kingdom . |
| 1317543 | 5/1973 | United Kingdom . |
| 1443621 | 7/1973 | United Kingdom . |
| 1356402 | 6/1974 | United Kingdom . |
| 1416755 | 12/1975 | United Kingdom . |
| 1421395 | 1/1976 | United Kingdom . |
| 1472480 | 5/1977 | United Kingdom . |

*Primary Examiner*—Lorenzo B. Hayes
*Assistant Examiner*—Amelia B. Yarbrough
*Attorney, Agent, or Firm*—Schwartz, Jeffery, Schwaab, Mack, Blumenthal & Koch

[57] ABSTRACT

The present invention relates to a pressure-sensitive recording material having improved storability, lightfastness and heat resistance, which comprises a unit containing a dye precursor or its solution and a unit containing a dye acceptor material which is capable of color formation by reaction with the dye precursor. The pressure-sensitive recording material according to the invention is characterized in that the dye acceptor material is an intimate mixture comprising (a) a 2-hydroxy-benzophenone of the general formula I

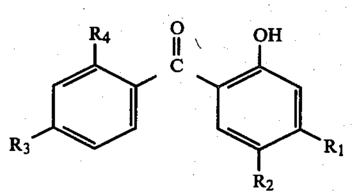

or 3,5,7,3',4'-pentahydroxy-flavone of the formula II

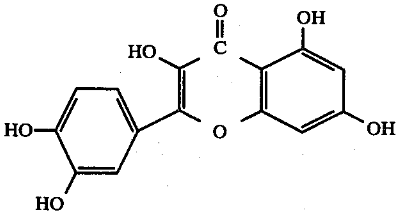

(b) a substituted benzotriazole of the general formula III

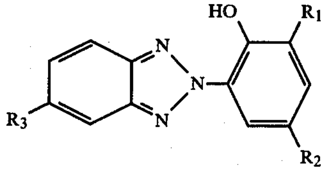

and, optionally, an inert waxy binder. The invention further relates to further embodiments of this recording material with improved properties as well as process for producing the pressure-sensitive recording materials according to the invention.

51 Claims, No Drawings

PRESSURE SENSITIVE RECORDING MATERIALS

The present invention relates to a recording material in sheet or web form, having improved storability, light-fastness and heat-resistance. It relates, in particular, to a novel dye acceptor material or dye developer material respectively, which, in combination with the carrier material with which it is coated or into which it is incorporated, represents a unit of the pressure-sensitive recording paper and which can be employed with a large number of known dye precursors or dye-forming substances in pressure-sensitive recording materials.

Pressure-sensitive recording papers according to the invention are known as chemical recording papers or carbonless papers. In general, they consist of a unit carrying a dye precursor or dye-forming substance or its solution, (in sheet or web form, the dye precursor incorporated into the carrier material or coated on to the carrier material,) and a unit carrying in identical manner the dye acceptor or dye developer, which is capable of dye formation by reaction with the dye precursor, if, by the action of an external physical force such as in particular, pressure, the dye precursor or its solution comes into contact with the dye acceptor. In this way, a marking or drawing corresponding to the external force is created. The unit in web or sheet form, comprising the dye precursor or dye-forming substance, generally carries the latter on its rear-side and is then known as the CB sheet ("Coated Back-sheet") or CB web; the unit comprising the dye acceptor generally carries it on its front-side and then is called the CF sheet ("Coated Front-sheet") or CF web. Additionally, the carrier material in sheet or web form carrying the dye acceptor coat may also carry on its other surface a coat containing dye precursor or its solution and combined with a further CF unit in sheet or web form, containing dye acceptor, so that a three-sheet recording material results, with which two copies can be simultaneously produced. Multi-sheet sets for the simultaneous production of an even larger number of copies can also be assembled.

In principle, the development of markings or drawings on pressure-sensitive recording papers is effected by reaction of a colourless or faintly coloured dye precursor or chromogenic dye-forming substance with a material which is capable of forming the dye by reaction with the dye precursor, i.e. a dye acceptor, the colour being developed during the reaction. The dye precursors used in these papers are not generally dyes in the broad sense of the meaning, but materials which are able to form a colour by reaction with the dye acceptor, whether by physico-chemical absorption or by chemical reaction.

Numerous compounds known as dye precursors are used for pressure-sensitive recording papers. These are colourless or faintly coloured aromatic organic compounds with double bonds, which are converted into a more highly polarised, conjugated and, therefore, coloured form, when reacted with an acidic sensitizer. A preferred class of this type of dye precursor or chromogenic material includes compounds of the phthalide type, such as crystal violet lactone (3,3-bis-(p-dimethylaminophenyl)-6-dimethylaminophthalide) and malachite green lactone (3,3-bis-(p-dimethylaminophenyl)phthalide), indole-substituted pyromellitides, leuco-auramines and benzospiropyranes, as listed in detail in West German Offenlegungsschrift 23 06 454, triphenylmethane dye precursors of the phthalane type as described in West German Patent Specification 14 21 393, benzodifuran derivatives as described in West German Patent Specification 14 21 394, or pyridine carboxylic acid lactones as are disclosed, for example, in West German Patent Specification 24 12 640.

In order to explain the advantages of the recording material according to the invention over the hitherto known recording materials, the mechanism of colour formation has to be considered and may be illustrated by reference to the best known representative of the dye precursors of the triphenylmethane series, crystal violet lactone,—CVL for short. Crystal violet lactone belongs to the triphenylmethane dyes, which, on the basis of their constitution, can assume different tautomeric structures, responsible for colour formation.

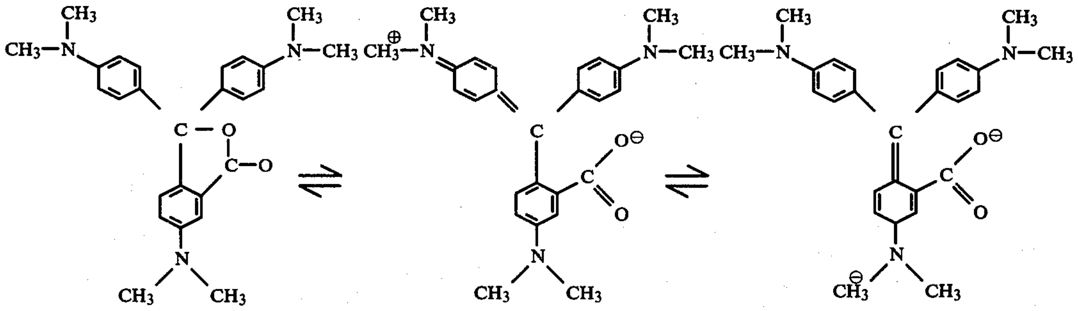

In addition, the trityl isomer containing a carbonium ion would seem to be present to a slight extent:

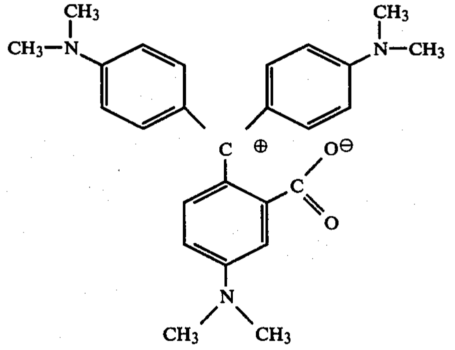

In this connection, steric effects prevent these radicals dimersing to hexaarylethane derivatives. Since free radicals of the last-mentioned constitution have more stable and intense coloration than the other isomers, production of this structure is preferred.

Now the tendency in coatings of carbonless papers is to burst the lactone ring of the crystal violet lactone by reaction with other substances (dye acceptors) and thus to form the other isomeric structures and to obtain the colour effect in this way. The best known reaction partners for the crystal violet lactone are the so-called clays. These are inorganic products, such as clays, silicates, attapulgite, argosite, calcinated diatomaceous earth, activated silica, sodium aluminium zeolite, pyrophillite, bentonite, magnesium montmorillonite and the like. All these products are electron acceptors.

As, however, these substances allow the colour effect to develop only very slowly, it has been proposed to add metallic salts to them. According to West German Auslegeschrift 1 771 641, addition of aluminium salts and zinc salts or activation of clays by acid treatment and subsequent calcination at from 200° to 1000° C. has been proposed. According to West German Auslegeschrift 1 809 778, the use of acid-treated montmorillonite is prepared, the colour developing capacity being achieved by an increase in the surface of the dye acceptor. A further improvement is described in West German Patent Specification 2 023 152, according to which alkali metal salts of organic acids are added to the clay materials.

The next major progress in the field of colour development sheets (sheets with dye acceptors) was the use of phenolic substances for colour development,—see for example British Patent Specification 1,090,866, British Patent Specification 1,416,755, British Patent Specification 1,421,395, West German Patent Specification 1 421 397, West German Offenlegungsschrift 1 511 277, West German Auslegeschrift 1 671 561, West German Auslegeschrift 1 805 844 and West German Auslegeschrift 1 926 370. Starting from the pure mechanism of colour formation, the alkyl-substituted and halogen-substituted phenols, employed in West German Patent Specification 1 934 457 for polycondensation, led to further progress, since halogen atoms have high electron affinity and they increase the acidity of the phenolic proton. As a result, the splitting of the lactone ring of the crystal violet lactone and similar compounds is improved and thus colour formation is accelerated. Moreover, phenolic groups, substituted by electron-depressing groups, i.e. those with positive mesomerism effect, were incorporated into the polycondensate, as a result of which the dye, after its formation, is more stable. A shortcoming, however, is the relative toxicity of many substances of this group.

Furthermore, it has been proposed to employ phenol/aldehyde resins and phenol/acetylene resins, in combination with the dye acceptor layer, with various additives,—see for example West German Auslegeschrift 2 120 920, West German Auslegeschrift 2 127 852, West German Auslegeschrift 2 128 518, West German Patent Specification 2 119 467, West German Auslegeschrift 2 132 849, West German Patent Specification 2 164 512. For improving the stability of the colouration being formed, it was proposed, according to West German Auslegeschrift 2 219 556, to coat a phenol/formaldehyde polymer on to basic pigments. Pigments which absorb light within the range of from 230 to 370 nm, are described as being suitable. Example of these are calcium carbonate, magnesium oxide as well as calcium phosphate and magnesium phosphate,—cf. also West German Offenlegungsschriften 2 342 596, 2 426 678 and 2 407 622. It is then proposed in West German Auslegeschrift 2 242 250 to combine the metal ions, which are important for the rapid development of colour in the dye acceptor layer, in the form of salicylic acid salts, i.e. in the form of a phenol-type substance, with the clays-,—see also U.S. Pat. Nos. 4,063,754, 4,112.138 and 4,090,619. For enhancing the colour effect, so-called secondary colour developers are additionally used with carbonless papers. A generally customary secondary colour developer is benzoyl leuco-Methylene Blue, 2,7-bis-(dimethylamino)-10-benzoyl phenothiazine. Its colour development takes place slowly by oxidation in air. In this case, 2,7-bis-(dimethylamino)phenothiazonium benzoate is formed, the benzoyl residue being split off. This dye is largely lightfast. A reaction frequently occurs with the metallic salts added to the phenolic substances or to the clay mixtures, with exchange of the benzoic acid anion for the anion of the salt. If, for example, metallic chlorides are employed, the corresponding 2,7-bis-(dimethylamino)-phenothiazonium chloride, the blue-coloured Methylene Blue, is formed. This salt has the tendency to absorb water. If it is present as zinc chloride double salt, however, which occurs with major excess of zinc chloride, the brown/copper-coloured zinc chloride double salt is formed, which leads to considerable undesirable discoloration, the more the primary dye fades owing to its lack of lightfastness. In addition, pronounced brown-spotted discoloration of the backside of the sheet can occur in systems, in which the zinc chloride is located on the CB side and the dye precursors on the CF side, in case of wrong positioning, in which pressure is exerted on the paper, or of unduly tight roll-winding of web-shaped recording materials, the water-soluble phenothiazonium double salt being transferred from the front side to the superimposed following backside, since some moisture always accumulates there through the strongly hygroscopic zinc chloride. Thus, this undesirable effect is not a case of "bleeding" of the dyes through the doubly-coated intermediate sheets, which is otherwise observed in practice when low quality papers are used, but the effect mentioned can also take place on a CB-coated cover sheet after the assembly of the recording set.

Attempts have also been made to protect the light stability of the primary colour developer, i.e. of the triphenylmethane dye, from fading, i.e. from the action of light, by addition of other substances. Inter alia, the ultraviolet light absorbing alkaline earth metal carbonates, which have already been mentioned, serve for this purpose. West German Offenlegungsschrift 2 129 467 describes the addition of certain colourless phenothiazines, substituted by electron donor groups. According to West German Auslegeschrift 1 267 961, hydroquinone and phenyl-$\beta$-naphthylamine are directly added in paper manufacture. Further additives of this kind, such as diaminostilbene and benzimidazole, are described in West German Auslegeschrift 1 809 778.

Apart from the undesirable fading of the writing after its intended formation, there is a second important problem with carbonless papers, viz. the premature formation of discolorations, which make the carbonless paper appear as soiled. Above all, this problem occurs with papers containing clays. The individual clay particles project to an certain degree from the surface of the coat containing them and produce a certain roughness. During the storage of high paper stacks, they exert pressure on the adjacent sheet and make the micro-capsules with the colour-forming substances burst there. On the one hand, the colour-forming substances already yield colour effects with the clays to a certain extent. This cannot be avoided either by providing "spacers", such as spherical cellulose particles, in the layer carrying the clay particles. Spherical spacers of this type, too, exert the pressure described on the adjacent sheet and do not prevent the bursting of microcapsules with colour-developers. What is important, however, is that an additional cause of the undesirable colour effects arises in the form of a reaction of the colour developer or colour acceptor with paper ingredients and additives, the nature of which are frequently unknown to the manufacturer of carbonless papers, complete full analyses being too expensive and too cumbersome in the end. Therefore reaction stabilisers have to be added to the system. Extremely unpleasant surprises can occur after a certain period of storage, especially with woody papers. Papers, manufactured from cheap, rapid-growing tropical timber types, may contain the following compounds:

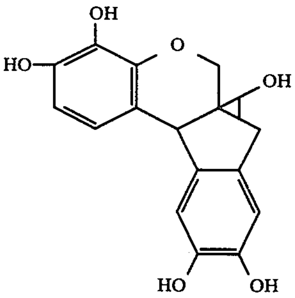

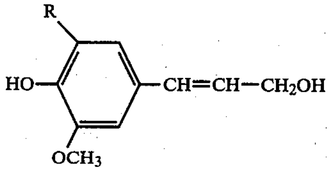

(R=H or $OCH_3$)

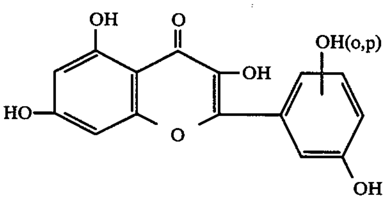

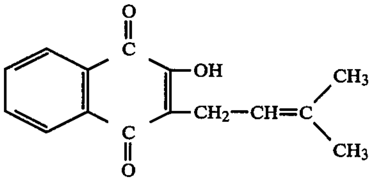

It can be easily seen that papers containing such products are absolutely made for producing discoloration with triphenylmethane dyes. Even in the absence of triphenylmethane dyes, such compounds are responsible for woody papers being usually yellowish coloured. However, care should be taken even in the case of white-appearing papers, because many papers are brushed with kaolin, a clay type, or they contain tannin, which can then react with the metal ions, frequently contained in dye acceptor coats, and develop discolorations, so that, in this case, the discoloration is not caused by the dye. Ultramarine is also frequently added to yellow papers, which approximately corresponds to the molecular formula $Si_3Al_3Na_4S_2O_{12}$. Ultramarine makes the paper appear white by a complementary colour reaction. This clay-type substance is similarly made for reacting with triphenylmethane dyes. In view of the large extent to which ultramarine is sold in the paper industry, the risk of buying a "white paper" that is not white,—i.e. free from dye,—at all, is very great.

In order to avoid the two types of premature discoloration described, urea or urea derivatives, such as thiourea, triethanolamine, monoethanolamine, cyclohexylamine, diethylene triamine, acid amides, morpholine or unsaturated hetero-cyclic compounds containing nitrogen and oxygen have been used hitherto,—see for example British Patent Specification 789,396, West German Patent Specification 2 153 043, West German Patent Specification 2 164 512, West German Offenlegungsschrift 2 426 678 and West German Offenlegungsschrift 2 443 576. Additives of this type, however, have the disadvantage that, in case of excessive dosage, the colour effect, produced by the action of pressure, develops only too little or not at all. It is however frequently not possible to foresee what dosage is not excessive, since the nature and the quantity of the product causing these premature discolorations in the paper employed are unknown to the manufacturer of carbonless papers. Additionally, amines of the above type may cause damage to health.

Not only ingredients of the paper, but also the solvents used in the production of printed carbonless papers may have a considerable undesirable influence on the intended colour effect by solvate-chromatic phenomena. Crystal violet and phenolic substances yield a blue colour, which is decolorised on addition of ketones, ethers, esters, sulphoxides, sulphones, sulphides, nitriles, and amines as solvent, but is not influenced by benzene, toluene and xylene. Crystal violet with lower fatty acids, such as acetic acid, propionic acid or butyric acid, yields a blue colouration, which, by way of contrast, is decolourised by benzene, toluene or xylene. With higher fatty acids, such as caproic acid, however, crystal violet does not yield any colouration; however, a colouration, which again disappears on addition of benzene, toluene or xylene, appears on addition of methanol, ethanol or propanol with such fatty acids. The blue colouration produced by crystal violet and benzoic acid, which is similarly enhanced by methanol, fades however on addition of the aromatic solvents mentioned. The colouration effected by combination of crystal violet and salicylic acid is not decolourised by solvents of polar character; however, colour reduction but not decolourisation occurs on addition of alcohols. The decolourisation with ester such as ethyl acetate of the colour occurring during the combination of crystal violet with phenols does not however occur with the ethyl ester of chloroacetic acid. This series of corresponding phenomena could be considerably extended and shows that, without accurate knowledge of the printing inks and solvents for the latter employed in the production of the papers used as carriers in carbonless papers and similar pressure-sensitive recording materials and in the production of printed carbonless papers, production of pressure-sensitive recording materials of this type and their storage and application is made extremely difficult and the appearance of one or the other or several of the disadvantages described cannot be foreseen at all.

It is thus an object of the present invention to provide a dye acceptor material, which/reacts with, if possible, all triphenylmethane dye precursors or similarly reacting dye-forming substances, with formation of a durable, sufficiently strong colour effect, and, at the same time, avoids, as completely as possible, the undesirable side-effects described above and thus, regardless of whether it is placed in the CB or CF arrangement or on a carrier material that is coated on both sides or is incorporated into the carrier material, enables pressure-sensitive recording materials to be produced, having improved storability, lightfastness and heat-resistance.

The pressure-sensitive recording material, having improved storability, lightfastness and heat-resistance, according to the invention, consists of a unit containing a dye precursor or its solution and a unit containing a dye acceptor material, which is capable of colour formation by reaction with the dye precursor, or of a plurality of such unit pairs, e.g. in the form of a writing-set for the simultaneous supply of a plurality of copy prints. The pressure-sensitive recording material according to the invention is characterised in that the dye acceptor material consists of an intimate mixture, which contains (a) either (aa) a 2-hydroxy-benzophenone of formula I

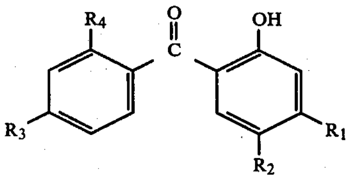

(I)

where $R_1$ is a hydroxy-group, an unsubstituted alkoxy residue with from 1 to 18 carbon atoms or an alkoxy residue with from 1 to 4 carbon atoms, carrying 1 or 2 hydroxy-groups, optionally esterified with a saturated or olefinically unsaturated carboxylic acid with from 2 to 4 carbon atoms, $R_2$ is hydrogen, a phenyl residue, the sulphonic acid group $—SO_3H$ or the group $—SO_3Me$, Me being an alkali metal, $R_3$ is hydrogen, the hydroxy group, an alkyl group with from 1 to 12 carbon atoms, an alkoxy group with from 1 to 18 carbon atoms or a phenyl residue, and $R_4$ is hydrogen, the hydroxy-group, a phenyl residue, the carboxy-group —COOH or the group —COOMe, Me being an alkali metal;

or (bb) hydroxyflavone quercetin, i.e. 3,5,7,3',4'-pentahydroxy-flavone of formula II

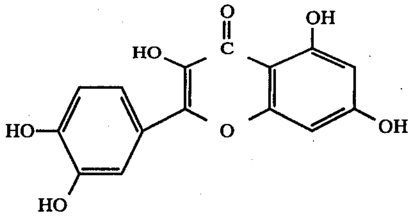

(II)

and (b) a substituted benzotriazole of formula III

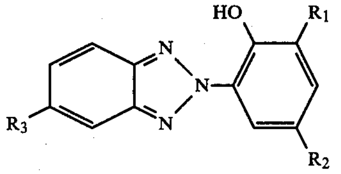

(III)

where $R_1$ is hydrogen or the tertiary butyl group, $R_2$ an alkyl residue with from 1 to 12 carbon atoms, an alkoxy residue with from 1 to 12 carbon atoms, the cyclohexyl residue, the sulphonic acid group $—SO_3H$ or the group $—SO_3Me$, Me being an alkali metal, and $R_3$ is hydrogen or chlorine, and, optionally, an inert waxy binder.

According to a preferred embodiment, the dye acceptor material consists of an intimate mixture, which, in addition, contains a phenol having a special steric configuration, viz. one or more phenols from the group of 2,4,6-tris-(3,5-di-tert.butyl-4-hydroxybenzyl)mesitylene, 1,1,3-tris-(2'-methyl-4'-hydroxy-5'-tert.butylphenyl)butane, n-octadecyl$\beta$-(3,5-di-tert.butyl-4-hydroxy-phenyl)propionate, pentaerythritol$\beta$-(3,5-di-tert.butyl-4-hydroxy-phenyl)propionate and a 2-n-alkylthio-4,6-di-(3',5'-di-tert.butyl-4'-hydroxy-phenoxy)-1,3,5-triazine, having from 4 to 12 carbon atoms in the alkylthio residue. Owing to the complex structures of these special phenols, the triphenylmethane dyes are "screened" after their formation, so that further light protection is effected by them.

Really optimum protection for color stability, however, is achieved by mixing one or more of the special phenol derivatives with both the $\alpha$-ketophenols of formulae I or II and the benzotriazole derivative of formula III. For achieving advantageous effects, the special additional phenols may rather be omitted in the dye acceptor material according to the invention than the benzotriazole derivatives of formula III. A further improvement in the lightfastness and storage stability of the colour effects, produced with triphenylmethane dyes, is obtained if, in addition to the $\alpha$-ketophenols of formula I or II and the substituted benzotriazole derivatives of formula III and, optionally, the special phenols, a metallic complex salt of formula IV (IV)

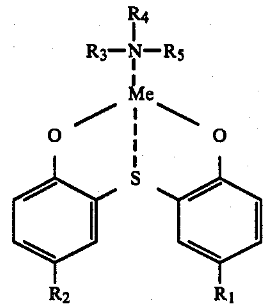

is mixed into the dye acceptor material, where $R_1$ and $R_2$, which may be identical or different, are branched chain, preferably tertiary, alkyl residues with from 6 to 12 carbon atoms, $R_3$ is a straight chain or branched chain alkyl residue with from 3 to 12 carbon atoms, in which case $R_4$ and $R_5$ then are hydrogen, or one, two or three of the residues $R_3$, $R_4$ and $R_5$ are hydroxy-lower alkyl residues with from 2 to 6 carbon atoms, the other residue or residues being hydrogen atoms, nd Me is Co, Ni, Mn, Zn, Fe, Cu, Cr or Va. Preferably, $R_3$ is a n-alkyl group with from 3 to 5 carbon atoms or the 3,3-dimethylbutyl residue and Me is Co, Ni, Mn, Zn or Fe.

Addition of these compounds particularly achieves stabilisation of the dye acceptor coat against premature colour reaction during storage of high paper stacks of the pressure-sensitive recording material or in case of unduly tight winding of rolls of web-shaped pressure-sensitive recording material. Furthermore, additional stabilisation of the colour effect produced is effected. According to a further embodiment, the dye acceptor material, in addition to the components of formulae I or II and III and, preferably, also in addition to the other above-mentioned components, contains from 0.1 to 1% by weight, preferably from 0.1 to 0.5% by weight of 5,10,11,11α-tetrahydro-9,11-dihydroxy-8-methyl-5-oxo-1H-pyrrolo[2.1-c][1.4]-benzodiazepine-2-(trans)-acrylamide of formula V.

(V)

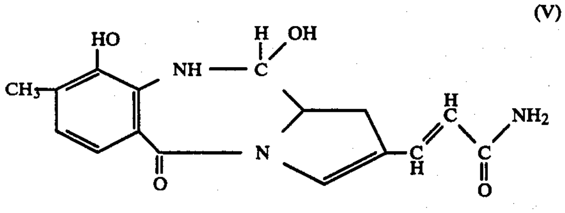

This agent, which is well known from the field of medicine, is not only capable of reacting by means of the phenolic hydroxy-group, present in the 9-position, with the triphenylmethane dye precursor products, but, owing to its acid amide group, which is activated by the adjacent double bond, and to the amine-group, present in the 10-position and activated, in turn, by the phenolic hydroxy-group present in the 9-position, it can be employed with improved result instead of the prior above-mentioned urea derivatives and, in this case, avoid premature reaction of the dye precursor products with the components of the dye acceptor material in case of pressure caused by high paper stacks or unduly tightly wound rolls of web-shaped pressure-sensitive recording material.

According to a preferred embodiment, the dye acceptor material according to the invention, in addition to the components of formulae I or II and III, contains at least one of the special phenols, one of the complex metal salts of formula IV as well as the said benzodiazepine-2-acrylamide derivative in the quantity indicated. All the above-mentioned components of the dye acceptor material according to the invention represent white to cream-coloured products. If, however, a dye acceptor coat in pale colour is desired, a [1-phenyl-3-methyl-4-alkyl ether-pyrazolate-(5)]Me(II) complex salt can be advantageously employed, together with the special phenols listed, the alkyl group in the alkyl ether residue containing from 1 to 12 carbon atoms, in straight or branched arrangement, and Me being Co, Ni, Mn, Zn, Fe, Cu, Cr or Va. Thus the nickel complexes have a pale green colour. The preferably employed metal complexes mentioned yield additional deepening of the colour effect, besides which the lightfastness of the colour effects produced is further enhanced.

The mixtures of the individual components of the dye acceptor material according to the invention can be applied from the melt of the waxy binders to the paper serving as the carrier, which is not only environmentally desirable, but also reduces the otherwise customary expenditure of labour to a minimum and saves solvents and energy for drying. In addition, more rapid mechanical application is feasible, which makes the manufacturing process even more economical. The ingredients are added after weighing, dosage and mixing, with constant stirring, optionally to a pre-melted wax/synthetic material mixture or natural wax/synthetic wax mixture and subsequently milled in a bead-mill until such time as a degree of fineness has been attained, which corresponds to the milling of carbon paper colours. During application, the finished composition should be stirred, agitated by pumping or, optionally, treated with ultrasonic waves, so as to obtain an invariably satisfactory homogeneous coating.

If the dye acceptor material is to be applied to the CF side of the paper sheets or webs, it is applied in a quantity of from 0.5 to 4 $g/m^2$. If the dye acceptor material is to be applied to the CB side, somewhat greater layer thicknesses are required. Appropriately, a quantity of between 2 and 6 $g/m^2$ is applied. Optionally, fillers, such as tallow or cellulose fibres, can be milled with the composition and incorporated into it.

For application from the melt usual papercoating machines, e.g. machines of the type CCB-Spezial, Kst 250/900 or DS 400/600 of the German company Spezial-Papiermaschinenfabrik August Alfred Krupp GmbH & Co, D-4010 Hilden, are suitable, a few machine types enabling the coat to be simultaneously printed on in one operation, if it is desired.

It is however also possible, if desired by the processor for any reason, to apply the dye acceptor material according to the invention from a solvent, e.g. a lower alkanol, particularly isopropanol. This alcohol has a pleasant odour, is allowed to be processed at a high workshop concentration and does not require any large quantities of energy for drying. In practice, the procedure is to add the alcohol after milling into the finished wax melt, enriched with the components, with constant stirring by means of a rapid agitator. If the dispersion is continued to be stirred until cooling, a pasty composition is produced, which is easily applied.

It is also possible to incorporate directly the individual components of the dye acceptor material according to the invention into the paper during the production of the paper. for this purpose, the components are well milled, together with cellulose fibres, and the mixture is subsequently added to the paper before addition of the sizing agent.

The following examples serve for further illustration of the present invention, without limiting it to them. Quantitative data in parts are parts by weight, unless otherwise stated.

Examples 1 to 18: Application from the melt

General indication regarding the products of Examples 1 to 18 for processing:

The agents and, optionally, fillers present, such as barium sulphate and cellulose derivatives, are stirred into the oil product acccording to the formulation in question and, optionally, made into a paste with the fatty products or added to the molten waxes or their mixtures with waxy synthetic materials and milled in a ball-mill for from 3 to 4 hours, according to the type of mill, with further supply of heat, until a degree of milling has been attained that is otherwise customary for carbon paper colours, (degree of fineness from 6 to 10 μm, approximately).

For the further processing and paper coating, usual coating devices are employed.

The thickness of the paper coating generally lies between 0.5 and 4 g/$m^2$, when the paste is applied to the CF side and serves as acceptor for capsule papers. It can still be satisfactorily written on with ball-point pens in this application range.

If the product obtained according to the examples is to be applied to the CB side in certain systems, e.g. when the CF side is printed on with a printing ink containing a dye precursor, it can be transferred by pressure, if it is applied in a layer thickness of between 2 and 6 g/$m^2$. The paper material used is the material customary in the production of carbonless papers, depending on the number of copies present in the set.

The products of Examples 5 to 11 are preferably used for CF applications, while those of Examples 1 to 4 and 12 to 16 are suitable for CF applications as well as for CB applications.

The best constrasts are naturally achieved if the dye preproducts selected are those that produce blue or black colour developments with the dye acceptor coat according to the invention. Coloured substrates have the advantage in multiple sets that they facilitate arrangement of the individual copies in the unit.

Example 1

| | |
|---|---|
| 3 parts | compressor oil according to DIN 51506 kinematic viscosity at 40° C.: $1.06 \times 10^{-4}$ $m^2$ $s^{-1}$ (+ − 10%) |
| 3 parts | compressor oil according to DIN 51506 kinematic viscosity at 40° C.: $9.8 \times 10^{-5}$ $m^2$ $s^{-1}$ (+ − 10%) |
| 50 parts | paraffin-containing low pressure polyethylene |
| 20 parts | micro-wax |
| 10 parts | soft paraffin |
| 5 parts | sodium 2,2'-dihydroxy-4,4'-dimethoxy-benzophenone-5-sulphonate |
| 3 parts | 2-(2'-hydroxy-3'-tert.butyl-5'-heptyloxy-phenyl)-benzotriazole |
| 2 parts | pentaerythritol β-(3,5-di-tert.butyl-4-hydroxy-phenyl)-propionate |
| 2 parts | [2,2'-thio-bis-(4-tert.hexyl-phenolate)]-cyclo-hexylamine-Co(II) |
| 2 parts | [1-phenyl-3-methyl-4-propoxy-pyrazolate(5)]$_2$ Cu(II) |

Example 2

| | |
|---|---|
| 12 parts | special oil according to DIN 51525 kinematic viscosity at 40° C.: $6.8 \times 10^{-5}$ $m^2$ $s^{-1}$ (+ − 10%) |
| 40 parts | hard paraffin from Fischer-Tropsch synthesis |
| 10 parts | micro-wax |
| 10 parts | paraffin-containing low pressure polyethylene |
| 8 parts | soft paraffin |
| 8 parts | 2,2',4,4'-tetrahydroxy-benzophenone |
| 6 parts | 2-(2'-hydroxy-3', 5'-di-tert.butyl-phenyl)-benzotriazole |
| 3 parts | 2,4,6-tris-(3',5'-di-tert.butyl-4-hydroxy-benzyl)-mesitylene |
| 0.4 part | 5,10,11,11α-tetrahydro-9,11-dihydroxy-8-methyl-5-oxo-1H-pyrrolo[2.1-c][1.4]-benzodiazepine-2-(trans)-acrylamide |
| 2.6 parts | [1-phenyl-3-methyl-4-tert.octyloxy-pyrazolate-5]$_2$ Mn(II) |

Example 3

| | |
|---|---|
| 5 parts | extended range oil HD 20/50 |
| 2 parts | special oil according to DIN 51525 kinematic viscosity at 40° C.: $6.8 \times 10^{-5}$ $m^2$ $s^{-1}$ (+ − 10%) |
| 2 parts | compressor oil according to DIN 51506 kinematic viscosity at 40° C.: $9.8 \times 10^{-5}$ $m^2$ $s^{-1}$ (+ − 10%) |
| 2 parts | petroleum jelly |
| 30 parts | partially saponified ester wax, based on crude montan, light-coloured |
| 25 parts | low pressure polyethylene, containing emulsifying agent |
| 20 parts | micro-wax |
| 10 parts | 2-hydroxy-4-n-octoxy-benzophenone |
| 2 parts | 2-(2'-hydroxy-3'-tert.butyl-5'-tert.octyl-phenyl)-5-chloro-benzotriazole |
| 1.5 parts | 2-n-octylthio-4,6-di-(4'-hydroxy-3',5'-di-tert.butyl-phenoxy)-1,3,5-triazine |
| 0.5 part | 5,10,11,11α-tetrahydro-9,11-dihydroxy-8-methyl-5-oxo-1H-pyrrolo[2.1-c][1.4]-benzodiazepine-2-(trans)-acrylamide |

Example 4

| | |
|---|---|
| 7 parts | neat's foot oil |
| 30 parts | low pressure polyethylene, containing emulsifying agent |
| 20 parts | partially saponified ester wax, based on crude montan |
| 10 parts | acid wax, based on crude montan (light-coloured) |
| 5 parts | carboxymethyl cellulose |
| 5 parts | $CaSO_4$ |
| 10 parts | sodium 2,2'-dihydroxy-4,4'-dimethoxy-benzophenone-5 sulphonate |
| 8 parts | 2-(2'-hydroxy-3'-tert.butyl-5'-dodecyl-phenyl)-5-chloro-benzotriazole |
| 5 parts | [2,2'-thio-bis-(4-tert.octyl-4'-tert.dodecyl-phenolato)]-n-decylamine Zn(II) |

Example 5

| | |
|---|---|
| 5 parts | industrial oil according to DIN 51501: H-oil kinematic viscosity at 40° C.: $1.0 \times 10^{-4}$ $m^2$ $s^{-1}$ (+ − 10%) |
| 2 parts | neat's foot oil |
| 3 parts | petroleum jelly |
| 10 parts | catalytically oxidised wax from Fischer-Tropsch and Ziegler paraffins |
| 10 parts | low pressure polyethylene, having 30% paraffin content |
| 10 parts | low pressure polyethylene, containing |

-continued

| | |
|---|---|
| | emulsifying agent |
| 30 parts | micro-wax |
| 5 parts | cellulose acetate (38.3% acetate content) |
| 5 parts | barium sulphate |
| 14 parts | 2,2'-dihydroxy-4-octoxy-benzophenone |
| 6 parts | 2-(2'-hydroxy-3', 5'-di-tert.butyl-phenyl)-5-chloro-benzotriazole |

Example 6

| | |
|---|---|
| 3 parts | industrial oil according to DIN 51517: CLP-oil kinematic viscosity at 40° C.: $6.8 \times 10^{-5}$ $m^2 s^{-1}$ (+−10%) |
| 1 part | industrial oil according to DIN 51501: kinematic viscosity at 40° C.: $4.6 \times 10^{-5}$ $m^2 s^{-1}$ (+−10%) |
| 2 parts | neat's foot oil |
| 2 parts | petroleum jelly |
| 30 parts | hard paraffin |
| 10 parts | micro-wax |
| 20 parts | low pressure polyethylene, containing emulsifying agent |
| 10 parts | low pressure polyethylene, having 30% paraffin content |
| 5 parts | cellulose acetopropionate (3% acetyl content and 39.2% propionyl content) |
| 5 parts | barium sulphate |
| 5 parts | 2-hydroxy-4-dodecyloxy-benzophenone |
| 3 parts | 2-(2'-hydroxy-3'-tert.butyl-5'-methyl-phenyl)-5-chloro-benzotriazole |
| 4 parts | β-(3,5-di-tert.butyl-4-hydroxy-phenyl)-propionate ester of pentaerythritol |

Example 7

| | |
|---|---|
| 4 parts | industrial oil according to DIN 51502: H-oil kinematic viscosity at 40° C.: $1.5 \times 10^{-4}$ $m^2 s^{-1}$ (+−10%) |
| 2 parts | industrial oil according to DIN 51524: HL-oil kinematic viscosity at 40° C.: $6.8 \times 10^{-5}$ $m^2 s^{-1}$ (+−10%) |
| 5 parts | petroleum jelly |
| 20 parts | low pressure polyethylene, containing emulsifying agent |
| 20 parts | micro-wax |
| 10 parts | partially saponified ester wax, based on crude montan (light-coloured) |
| 10 parts | acid wax |
| 10 parts | cellulose acetobutyrate (13.5% acetyl content, 37% butyryl content) |
| 8 parts | barium sulphate |
| 6 parts | 2-hydroxy-4-methoxy-benzophenone-5 sulphonic acid |
| 2 parts | 2-(2'-hydroxy-5'-methyl-phenyl)-benzotriazole |
| 1 part | 2,4,6-tris-(3',5'-di-tert.butyl-4'-hydroxy-benzyl)-mesitylene |
| 2 parts | [2,2'-thio-bis-(4-tert.octyl-phenolate)]-n-butylamine Ni |

Example 8

| | |
|---|---|
| 5 parts | special hydraulic oil according to DIN 51525 kinematic viscosity at 40°: $1.45 \times 10^{-4}$ $m^2 s^{-1}$ (+−10%) |
| 3 parts | petroleum jelly |
| 30 parts | hard paraffin |
| 15 parts | partially saponified ester wax |
| 15 parts | acid wax |
| 10 parts | methyl cellulose |
| 8 parts | barium sulphate |
| 4 parts | 2-hydroxy-4-methoxy-4'-methyl-benzophenone |
| 3 parts | 2-(2'-hydroxy-3',5'-di-tert.butyl-phenyl)-benzotriazole |
| 3 parts | [2,2'-thio-bis-(4-tert.dodecyl-phenolate)]-n-hexylamine Co(II) |
| 4 parts | β-(3,5-di-tert.butyl-4-hydroxy-phenyl)-propionate ester of pentaerythritol |

Example 9

| | |
|---|---|
| 5 parts | hydraulic oil according to DIN 51525 kinematic viscosity at 40° C.: $1.02 \times 10^{-4}$ $m^2 s^{-1}$ (+−10%) |
| 7 parts | petroleum jelly |
| 35 parts | low pressure polyethylene, containing emulsifying agent |
| 20 parts | micro-wax |
| 3 parts | methylhydroxypropyl cellulose |
| 8 parts | barium sulphate |
| 8 parts | 2,2',4,4'-tetrahydroxy-benzophenone |
| 8 parts | 2-(2'-hydroxy-5'-methyl-phenyl)-benzotriazole |
| 2 parts | [2,2'-thio-bis-(4-tert.hexyl-phenolate)]-cyclohexylamine Mn(II) |
| 3.5 parts | 1,1,3-tris-(2'-methyl-4'-hydroxy-5'-tert.butyl-phenyl)-butane |
| 0.5 part | 5,10,11,11α-tetrahydro-9,11-dihydroxy-8-methyl-5-oxo-1H-pyrrolo[2.1-c][1.4]-benzodiazepine-2-(trans)-acrylamide |

Example 10

| | |
|---|---|
| 8 parts | special oil according to DIN 51525 kinematic viscosity at 40° C.: $6.8 \times 10^{-5}$ $m^2 s^{-1}$ (+−10%) |
| 20 parts | low pressure polyethylene, containing emulsifying agent |
| 20 parts | micro-wax |
| 20 parts | soft paraffin |
| 15 parts | hydroxypropylmethyl cellulose |
| 9 parts | 2-hydroxy-4-(2'-hydroxy-3'-methacryloxy)-propoxy-benzophenone |
| 3 parts | 2-(2'-hydroxy-3'-tert.butyl-5'-sulphonyloxy-phenyl)-5-chloro-benzotriazole |
| 5 parts | [2,2'-thio-bis-(4-tert.octyl-phenolate)]-n-butylamine Zn |

Example 11

| | |
|---|---|
| 8 parts | special oil according to DIN 51525 kinematic viscosity at 40° C.: $6.8 \times 10^{-5}$ $m^2 s^{-1}$ (+−10%) |
| 20 parts | low pressure polyethylene, containing emulsifying agent |
| 20 parts | micro-wax |
| 20 parts | soft paraffin |
| 15 parts | hydroxypropylmethyl cellulose |
| 9 parts | quercetin (1,3,7,3',4'-penta hydroxy-flavone) |
| 3 parts | 2-(2'-hydroxy-3'-tert.butyl-5'-sulphonyloxy-phenyl)-5-chloro-benzotriazole |
| 5 parts | [2,2'-thio-bis-(4-tert.octyl-phenolate)]-n-butylamine Zn(II) |

Example 12

| | |
|---|---|
| 10 parts | petroleum jelly |
| 2 parts | neat's foot oil |
| 50 parts | low pressure polyethylene, containing emulsifying agent |
| 10 parts | paraffin-containing low pressure polyethylene (30% paraffin content) |
| 10 parts | micro-wax |
| 5 parts | soft paraffin |
| 6.5 parts | quercetin dimethyl ether (1,7,4'-trihydroxy-3,4'-dimethoxy-flavone) or 2',2'-dihydroxy- |

-continued

| | |
|---|---|
| | 4,4'-dimethoxy benzophenone |
| 6 parts | 2-(2'-hydroxy-3'-tert.butyl-5'-sulphonyloxy-phenol)-benzotriazole, sodium salt |
| 0.5 part | 5,10,11,11α-tetrahydro-9,11-dihydroxy-8-methyl-5-oxo-1H-pyrrolo[2.1-c][1.4]-benzo-diazepine-2-(trans)-acrylamide |

Example 13

| | |
|---|---|
| 4 parts | industrial oil according to DIN 51524: HL-oil kinematic viscosity at 40° C.: $6.8 \times 10^{-5}\ m^2\ s^{-1}$ (+−10%) |
| 4 parts | industrial oil according to DIN 51525: HLP-oil kinematic viscosity at 40° C.: $1.05 \times 10^{-4}\ m^2\ s^{-1}$ (+−10%) |
| 2 parts | petroleum jelly |
| 20 parts | partially saponified wax |
| 30 parts | paraffin-modified low pressure polyethylene (30% paraffin content) |
| 10 parts | catalytically oxidised wax from Fischer-Tropsch and Ziegler paraffins |
| 5 parts | micro-wax |
| 10 parts | soft ester wax |
| 5 parts | 2,4-dihydroxy-benzophenone |
| 5 parts | 2-(2'-hydroxy-5'-methyl-phenyl)-benzotriazole |
| 5 parts | [1-phenyl-3-methyl-4-methoxy-pyrazolate(5)]$_2$ Ni(II) |

Example 14

| | |
|---|---|
| 5 parts | compressor oil according to DIN 51506 kinematic viscosity at 40° C.: $1.03 \times 10^{-4}\ m^2\ s^{-1}$ (+−10%) |
| 1 part | neat's foot oil |
| 1 part | soya bean oil |
| 3 parts | petroleum jelly |
| 20 parts | paraffin-containing low pressure polyethylene |
| 10 parts | low pressure polyethylene, containing emulsifying agent |
| 20 parts | ester wax, based on crude montan (light-coloured) |
| 5 parts | soft ester wax, based on crude montan |
| 15 parts | micro-wax |
| 11 parts | 2-hydroxy-4-(2'-hydroxy-3'-methacryloxy)-propoxy-benzophenone |
| 3 parts | 2-(2'-hydroxy-3'-tert.butyl-5'-undecyloxy-phenyl)-benzotriazole |
| 1 part | [2,2'-thio-bis-(4-tert.butyl-phenolate)]-n-nonylamine Mn (II) |
| 3.8 parts | 2-n-octyl-thio-4,6-di-(4'-hydroxy-3',5'-di-tert.butyl-phenoxy)-1,3,5-triazine |
| 0.2 part | 5,10,11,11α-tetrahydro-9,11-dihydroxy-8-methyl-5-oxo-1H-pyrrolo[2.1-c][1.4]-benzodiazepine-2-(trans)-acrylamide |
| 1 part | [1-phenyl-3-methyl-4-undecanoyl-pyrazolate(5)]$_2$ Zn(II) |

Example 15

| | |
|---|---|
| 1 part | industrial oil according to DIN 51525 kinematic viscosity at 40° C.: $2.2 \times 10^{-4}\ m^2\ s^{-1}$ (+−10%) |
| 5 parts | industrial oil according to DIN 51524: HL-oil kinematic viscosity 40° C.: $1.0 \times 10^{-5}\ m^2\ s^{-1}$ (+−10%) |
| 4 parts | petroleum jelly |
| 30 parts | low pressure polyethylene, modified by 30% paraffin |
| 10 parts | hard paraffin from Fischer-Tropsch synthesis |
| 5 parts | low pressure polyethylene, containing emulsifying agent |
| 20 parts | micro-wax |
| 10 parts | ester wax, based on crude montan |
| 5 parts | 2-hydroxy-2'-phenyl-4-methoxy-4'-methyl-benzophenone |
| 3 parts | 2-(2'-hydroxy-3'-tert.butyl-5'-methyl-phenyl)-5-chloro-benzotriazole |
| 3 parts | 1,1,3-tris-(2'-methyl-4'-hydroxy-5'-tert.butyl-phenyl)-butane |
| 4 parts | [1-phenyl-3-methyl-4-ethoxy-pyrazolate(5)]$_2$ Zn(II) |

Example 16

| | |
|---|---|
| 2 parts | industrial oil according to DIN 51524: HLP-oil kinematic viscosity at 40° C.: $6.8 \times 10^{-5}\ m^2\ s^{-1}$ (+−10%) |
| 8 parts | industrial oil according to DIN 51503: KA-oil kinematic viscosity at 40° C.: $2.2 \times 10^{-5}\ m^2\ s^{-1}$ (+−10%) |
| 2 parts | petroleum jelly |
| 20 parts | acid wax, based on crude montan |
| 30 parts | micro-crystalline wax |
| 5 parts | refined paraffin |
| 8 parts | polyethylene-based wax, containing emulsifying agent |
| 14 parts | 2-hydroxy-4-methoxy-benzophenone |
| 5 parts | 2-(2'-hydroxy-3'-tert.butyl-5'-nonyl-phenyl)-benzotriazole |
| 1.8 parts | 2-n-octylthio-4,6-di-(4'-hydroxy-3',5'-di-tert. butyl-phenoxy)-1,3,5-triazine |
| 4 parts | [2,2'-thio-bis-(4-tert.hexyl-4'-tert.octyl-phenolato)]-n-octylamine Zn(II) |
| 0.2 part | 5,10,11,11α-tetrahydro-9,11-dihydroxy-8-methyl-5-oxo-1H-pyrrolo[2.1-c][1.4]-benzodiazepine-2-(trans)-acrylamide |

Examples 17 to 22 illustrate the application of the mixtures of products from solvents.

Example 17

| | |
|---|---|
| 10 parts | partially saponified ester wax |
| 10 parts | soft ester wax |
| 20 parts | non-emulsifiable special polyethylene wax |
| 40 parts | isopropanol |
| 8 parts | 2,4-dihydroxybenzophenone |
| 6 parts | 2-(2'-hydroxy-3'-tert.butyl-5'-methyl-phenyl)-5-chloro-benzotriazole |
| 1 part | 1,1,3-tris-(2'-methyl-4'-hydroxy-5'-tert.butyl-phenyl)-butane |
| 5 parts | [2,2'-thio-bis-(4-tert.octyl-phenolate)]-3,3-dimethylbutylamine Zn(II) |

The waxes are melted on a water-bath and passed into a heatable bead-mill. The agent mixture is then slowly poured into the running mill and milled until such time as a particle size of 6 μm is no longer exceeded.

The waxy melt is cooled until such time as it just starts crystallising out. The isopropanol is then added with a dispersing disc, with rapid stirring, and ice is rapidly placed into the water bath and stirring is continued until such time as a creamy composition has formed.

This composition is then applied on a channel brushing machine of the type KST 250/900 in a quantity of from 1.5 to 6 g/m$^2$ on to the CF paper side of a paper having a weight of 40 g/m$^2$ and freed from the solvent in the usual way.

Example 18

| | |
|---|---|
| 60 parts | partially neutralised polymethylvinylether-maleic monoethyl ester (50% in isopropanol) |
| 10 parts | hydroxypropyl cellulose |
| 10 parts | barium sulphate |
| 11 parts | sodium 2,2'-dihydroxy-4,4'-dimethoxy-benzophenone-5-sulphonate |

-continued

| | |
|---|---|
| 5 parts | 2-(2'-hydroxy-3',5'-di-tert.butyl-phenyl)-benzotriazole |
| 2 parts | β-(3,5-di-tert.butyl-4-hydroxy-phenyl)-propionate of pentaerythritol |
| 2 parts | [2,2'-thio-bis-(4-tert.octyl-phenolate)]-n-butylamine Ni(II) |

The polyvinylmethylether-maleic monoethyl ester solution is introduced into a bead-mill. The barium sulphate and the agents are then added into the running mill and milling is continued until such time as a particle size of about 6 μm has been attained. Only then is the hydroxypropyl cellulose added and milling again continued until such time as 6 μm has been attained. At this stage, the cellulose goes partially into solution. The undissolved residual quantity of cellulose is present in disperse form.

A pasty composition is formed, which is preferably employed for CF application, application being effected by the pressure spot method with a device of a as usual in the market; in a quantity of from 1.5 to 6 $g/m^2$ to a paper of 40 $g/m^2$.

Example 19

| | |
|---|---|
| 30 parts | acrylic polymer, 40% dispersion |
| 1.5 parts | dimethylaminoethanol |
| 35 parts | isopropanol |
| 20 parts | low pressure polyethylene, modified |
| 5 parts | 2-hydroxy-2'-phenyl-4-methoxy-4'-methyl-benzophenone |
| 4 parts | 2-(2'-hydroxy-5'-methyl-phenyl)-benzotriazole |
| 2 parts | 2,4,6-tris-(3',5'-di-tert.butyl-4'-hydroxy-benzyl)-mesitylene |
| 0.5 part | 5,10,11,11α-tetrahydro-9,11-dihydroxy-8-methyl-5-oxo-1H-pyrrolo[2.1-c][1.4]-benzodiazepine-2-(trans)-acrylamide |
| 1 part | [1-phenyl-3-methyl-4-tert.butyloxy-pyrazolate(5)]$_2$ Zn(II) |
| 1 part | [2,2'-thio-bis-(4-tert.hexyl-phenolate)]-cyclohexyl-amine Zn(II) |

The low pressure polyethylene is melted. Subsequently, the acrylate dispersion and the dimethylaminoethanol are added, with stirring. The mixture is heated, with stirring, until such time as the water has evaporated. Now it is placed into a heatable bead-mill, treated with the agents and milled until such time as a fineness of at least 6 μm has been attained.

The composition is now added slowly, with stirring, by means of a dispersing disc, into isopropanol, having a temperature of about 30° C., and continued to be stirred until such time as a uniform paste has been obtained. The paste is preferably processed further on a device of Example 18 and applied to the CF paper side in a quantity of from 1.5 to 6 $g/m^2$.

Example 20

| | |
|---|---|
| 60 parts | physically drying oil-free alkyd resin, 50% in isopropanol |
| 20 parts | barium sulphate |
| 6 parts | 2-hydroxy-4-methoxy-benzophenone-5-sulphonic acid |
| 6 parts | 2-(2'-hydroxy-3',5'-di-tert.butyl-phenyl)-5-chloro-benzotriazole |
| 2 parts | 1,1,3-tris-(2'-methyl-4'-hydroxy-5'-tert.butyl-phenyl)-butane |
| 6 parts | [2,2'-thio-bis-(4-tert.dodecyl-phenolate)]-diethanolamine Cu(II) |

The agents, together with the barium sulphate, are placed into a bead-mill, which has been previously filled with the alkyd resin solution. It is milled until no particle is present any longer, having a particle size of more than 6 μm. The resulting viscous paste is further processed as described in Example 17 or 18.

Example 21

| | |
|---|---|
| 50 parts | physically drying, abietic acid-containing alkyd resin, 40% in isopropanol |
| 15 parts | barium sulphate |
| 15 parts | hydroxypropyl cellulose |
| 12 parts | 2-hydroxy-4-n-octoxy-benzophenone |
| 5 parts | 2-(2'-hydroxy-3'-tert.butyl-5-nonyloxy-phenyl)-benzotriazole |
| 3 parts | [1-phenyl-3-methyl-4-isobutyloxy-pyrazolate(5)]$_2$ Zn(II) |

The mixture of the agents is (milled) to a particle size of at most 6 μm and further processed according to Example 17 or 18.

Example 22

Solvent application

| | |
|---|---|
| 60 parts | diglycol ester of petrex acid, 50% in isopropanol |
| 20 parts | talcum powder |
| 11 parts | 2,4-dihydroxybenzophenone |
| 4 parts | 2-(2'-hydroxy-3'-tert.butyl-5'-undecyloxy-phenyl)-benzotriazole |
| 4 parts | [2,2'-thio-bis-(4-tert.octyl-4'-tert.hexyl-phenolato)]-n-hexylamine Co(II) |
| 1 part | 2-n-octylthio-4,6-di-(4'-hydroxy-3',5'-di-tert. butyl-phenoxy)-1,3,5-triazine |

The agents and the talcum powder are mixed for about 4 hours and intimately milled in a ball-mill with balls having a minimum diameter of 1.5 cm. The degree of fineness should lie between 6 and 10 μm. This mixture is added by means of a shaking sieve, with rapid stirring, to the 50% isopropanol solution of the diglycol ester of petrex acid, until a uniformly creamy composition has formed, which is further processed as described in Example 17 or 18.

The Examples 23 to 29 illustrate the application of the mixture of products from aqueous dispersion.

Example 23

| | |
|---|---|
| 30 parts | partially saponified wax |
| 10 parts | polyethylene wax, containing emulsifying agent |
| 40 parts | polyvinyl acetate dispersion, 57%, with cellulose derivative as protective colloid |
| 4 parts | water |
| 1 part | barium sulphate |
| 7 parts | 2,2',4,4'-tetrahydroxy-benzophenone |
| 4 parts | 2-(2'-hydroxy-3'-tert.butyl-5'-methyl-phenyl)-5-chloro-benzotriazole |
| 1 part | 2,4,6-tris-(3',5'-di-tert.butyl-4'-hydroxy-benzyl)-mesitylene |
| 2 parts | [1-phenyl-3-methyl-4-methoxy-pyrazolate(5)]$_2$ Zn(II) |
| 1 part | [2,2'-thio-bis-(4-tert.octyl-4'-tert.butyl-phenolate)]-n-dodecylamine Zn(II) |

The wax mixture is melted and transferred into a heated bead-mill. The barium sulphate is added to the running mill by means of a shaking sieve. After thorough mixing, the agents are similarly added by means of a shaking sieve and the composition is milled for from 2 to 4 hours, until a degree of fineness of maximum 10 μm has been attained.

The mixture of waxes and solids is added to the PVA-dispersion, with rapid stirring, and the additional water is similarly added with rapid stirring.

The paste, which is capable of being processed, is coated on to paper of 55 $g/m^2$ in a quantity of 6 $g/m^2$ as CF application in a usual channel brushing machine.

Example 24

| | |
|---|---|
| 30 parts | modified polyethylene wax, containing emulsifying agent |
| 10 parts | carnauba wax |
| 20 parts | water |
| 25 parts | hydroxyethyl cellulose |
| 7 parts | 2-hydroxy-4-dodecyloxy-benzophenone |
| 5 parts | 2-(2'-hydroxy-3'-tert.butyl-5'-sulphonic acid-phenyl)-5-chloro-benzotriazole |
| 3 parts | [2,2'-thio-bis-(4-tert.dodecyl-phenolate)]-n-propylamine Ni(II) |

The waxes are melted and slowly treated with the agents and the hydroxyethyl cellulose in a bead-mill during milling and subsequently well milled for from 2 to 4 hours. When a degree of fineness of 6 μm has been attained, the wax/solid mixture is gradually dispersed, with constant stirring, in a vessel containing hot water. At this stage, part of the wax is emulsified, a further part, together with the solids, is very finely dispersed.

After the mixture has slowly cooled, with stirring, it can be further processed. It is coated as CF application on to paper of 50 $g/m^2$ by means of a usual roller-coater in a quantity of 4 $g/m^2$.

Example 25

| | |
|---|---|
| 15 parts | china-clay |
| 15 parts | Attasorb (a chemically passive, aluminum containing magnesium silikate with a high adsorption capacity) |
| 5 parts | water-glass |
| 10 parts | acrylic dispersion (50%) |
| 40 parts | water |
| 8 parts | 2,2'-dihydroxy-4-methoxy-benzophenone |
| 3 parts | 2-(2'-hydroxy-3-tert.butyl-5'-methyl-phenyl)-5-chloro-benzotriazole |
| 4 parts | [1-phenyl-3-methyl-4-tert.pentoxy-pyrazolate(5)]$_2$ Zn(II) |

The agents are thoroughly milled with clay, Attasorb and water-glass. Subsequently, the mixture is added to the acrylic dispersion, with constant stirring, and then diluted with water to the final concentration.

The product obtained is suitable for CF application as described in Example 23 or 24.

Example 26

| | |
|---|---|
| 30 parts | barium sulphate |
| 5 parts | water-glass |
| 15 parts | acrylic dispersion (50%) |
| 25 parts | water |
| 12 parts | 2-hydroxy-4-methoxy-benzophenone-5-sulphonic acid |
| 6 parts | 2-(2'-hydroxy-3'-tert.butyl-5'-methyl-phenyl)-5-chloro-benzotriazole |
| 5 parts | 2-n-octylthio-4,6-di-(4'-hydroxy-3',5'-di-tert. butyl-phenoxy)-1,3,5-triazine |
| 2 parts | [1-phenyl-3-methyl-4-ethoxy-pyrazolate(5)]$_2$ Zn(II) |

The aqueous dispersion is produced in accordance with Example 24 and applied to paper as CF application.

Example 27

| | |
|---|---|
| 10 parts | partially saponified wax, containing non-ionic emulsifying agent, added by the manufacturer |
| 10 parts | low pressure polyethylene, containing emulsifying agent |
| 5 parts | polyvinyl pyrrolidone |
| 25 parts | water |
| 10 parts | hydroxyethyl cellulose |
| 20 parts | $BaSO_4$ |
| 8 parts | 2-hydroxy-4-(2'-hydroxy-3'-methacryloxy)-propoxy-benzophenone |
| 8 parts | 2-(2'-hydroxy-5'-methyl-phenyl)-benzotriazole |
| 4 parts | [2,2'-thio-bis-(4-tert.hexyl-phenolate)]-n-octylamine Ni(II) |

The wax and the polyethylene are melted and transferred to a heated bead-mill. Polyvinyl pyrrolidone, barium sulphate and hydroxyethyl cellulose are now introduced into the running mill by means of a shaking sieve. Then the agents are added in the same way and the composition is milled for from 2 to 4 hours, until a degree of fineness of at most 10 μm has been attained. The mixture obtained is introduced into hot water, with rapid stirring, as in Example 23, the waxes being emulsified, the solids dispersed. The mixture is slowly stirred to cooling.

The dispersion obtained is coated on to paper as CF application, as described in Examples 23 and 24.

Example 28

| | |
|---|---|
| 25 parts | low pressure polyethylene, containing emulsifying agent |
| 30 parts | polyacrylic dispersion (46%) |
| 1 part | olein |
| 10 parts | ethylhydroxyethyl cellulose |
| 10 parts | barium sulphate |
| 5 parts | cross-linked polyvinyl pyrrolidone |
| 11 parts | 2,2'-dihydroxy-4-methoxy-benzophenone |
| 3 parts | 2-(2'-hydroxy-3'-tert.butyl-5'-tert.octyl-phenyl)-5-chloro-benzotriazole |
| 2 parts | 2-n-octylthio-4,6-di-(4'-hydroxy-3',5'-di-tert. butyl-phenoxy)-1,3,5-triazine |
| 0.5 part | 5,10,11,11 α-tetrahydro-9,11-dihydroxy-8-methyl-5-oxo-1H-pyyrolo[2.1-c][1.4]-benzodiazepine-2-(trans)-acrylamide |
| 1.5 parts | [2,2'-thio-bis-(4-tert.octyl-phenolate)]-n-butylamine Ni(II) |
| 1 part | [1-phenyl-3-methyl-4-propoxy-pyrazolate(5)] Fe(II) |

Production of the aqueous dispersion takes place in accordance with Example 24, the wax/solid mixture being introduced into the polyacrylic dispersion with rapid stirring.

The paper-coating as CF application is effected as described in Example 23 or 24.

Example 29

| | |
|---|---|
| 5 parts | crosslinked polyvinyl pyrrolidone |
| 25 parts | sodium polyacrylate dispersion (14%) |
| 20 parts | low pressure polyethylene, containing emulsifying agent |
| 20 parts | barium sulphate |
| 10 parts | ethylhydroxyethyl cellulose |
| 15 parts | 2-hydroxy-4-n-octoxy-benzophenone |
| 2 parts | 2-(2'-hydroxy-3'-tert.butyl-5'-sulphonic acid-phenyl)-5-chloro-benzotriazole |
| 2 parts | [2,2'-thio-bis-(4-tert.octyl-phenolate)]-n- |

-continued

| | |
|---|---|
| | butylamine Zn(II) |
| 1 part | [1-phenyl-3-methyl-4-hexyloxy-pyrazolate(5)]$_2$ Zn(II) |

The production and the CF application of the aqueous dispersion are effected as described in Examples 27 and 23.

Examples 30 to 35 illustrate the processing of the product mixtures into the paper composition in the paper machine.

Example 30

| | |
|---|---|
| 15 parts | partially saponified wax AV 1551 |
| 17 parts | 2-hydroxy-4-dodecyloxy-benzophenone |
| 14 parts | 2-(2'-hydroxy-5'-methyl-phenyl)-benzotriazole |
| 11 parts | 1,1,3-tris-(2'-methyl-4'-hydroxy-5'-tert.butyl-phenyl)-butane |
| 3 parts | [2,2'-thio-bis-(4-tert.octyl-4'-tert.butyl-phenolate)]-n-dodecylamine Zn(II) |
| 40 parts | water |

The wax is melted and milled with the agents in a bead-mill to a degree of fineness of maximum 6 μm. Subsequently, the dispersion is prepared by the wax-in-water method by means of a dispersing disc and rapid mixer, the wax being emulsified. 15 parts of the dispersion thus obtained are added, with stirring, to 85 parts of sulphite wood pulp with an impact ratio of 45° SR (Schopper-Riegler-Freiheit), which has been diluted with water to 0.8% aftęr treatment in a hollander.

The total suspension thus formed is then further processed by being passed in measured quantity by means of a discharge box to a Foundrinier paper machine. The agent-filled paper felt then is formed on the Foundrinier sieve and is further processed as usual.

The paper thus obtained may either be itself coated with capsules (single coat paper) or serve as CF sheet for already existing capsule paper.

Examples 31 to 35

The ingredients of the composition given in the following are mixed in a large ball-mill and milled at the same time. The well-blended mixture is now metered to the kaolin filler by means of a shaking sieve in such a way that from 3 to 6%, approximately, of agent mixture are present, related to the kaolin addition. The reservoir for the agents should be appropriately mounted in such a way that metering can take place directly on to the elevator, which, as usual with paper machines, conveys the kaolin from the discharge funnel into the dissolver pulping machine, the agents being mixed there with the sulphite/sulphate pulp in water, containing customary paper making chemicals. The total mash is further processed from there in the usual way.

The following agent mixtures were employed:

Example 31

| | |
|---|---|
| 8 parts | 2,4-dihydroxy-benzophenone |
| 6 parts | 2-(2'hydroxy-3'-tert.butyl-5'-methyl-phenyl)-5-chloro-benzotriazole |
| 1 part | 1,1,3-tris-(2'-methyl-4'-hydroxy-5'-tert.butyl-phenyl)-butane |
| 5 parts | [2,2'-thio-bis-(4-tert.octyl-phenolate)]-3,3-dimethylbutylamine Zn(II) |

Example 32

| | |
|---|---|
| 12 parts | 2-hydroxy-4-n-octoxy-benzophenone |
| 5 parts | 2-(2'-hydroxy-3'-tert.butyl-5'-nonyl-phenyl)-benzotriazole |
| 3 parts | [1-phenyl-3-methyl-4-isobutyloxy-pyrazolate(5)]$_2$ Zn(II) |

Example 33

| | |
|---|---|
| 11 parts | sodium 2,2'-dihydroxy-4,4'-dimethoxy-benzophenone-5 sulphonate |
| 5 parts | 2-(2'-hydroxy-3',5'-di-tert.butyl-phenyl)-benzotriazole |
| 2 parts | β-(3,5-di-tert.butyl-4-hydroxy-phenyl)-propionate of pentaerythritol |
| 2 parts | [2,2'-thio-bis-(4-tert.octyl-phenolate)]-n-butylamine Ni(II) |

Example 34

| | |
|---|---|
| 5 parts | 2-hydroxy-2'-phenyl-4-methoxy-4'-methyl-benzophenone |
| 4 parts | 2-(2'-hydroxy-5'-methyl-phenyl)-benzotriazole |
| 2 parts | 2,4,6-tris-(3',5'-di-tert.butyl-4'-hydroxy-benzyl)-mesitylene |
| 0.5 parts | 5,10,11,11 α-tetrahydro-9,11-dihydroxy-8-methyl-5-oxo-1H-pyrrolo[2.1-c][1.4]-benzodiazepine-2-(trans)-acrylamide |
| 1 part | [1-phenyl-3-methyl-4-tert.butyloxy-pyrazolate(5)]$_2$ Zn(II) |
| 1 part | [2,2'-thio-bis-(4-tert.hexyl-phenolate)]-cyclohexylamine Zn(II) |

Example 35

| | |
|---|---|
| parts | 2-hydroxy-4-methoxy-benzophenone-5-sulphonic acid |
| 6 parts | 2-(2'-hydroxy-3',5'-di-tert.butyl-phenyl)-5-chloro-benzotriazole |
| 2 parts | 1,1,3-tris-(2'-methyl-4'-hydroxy-5'-tert.butyl-phenyl)-butane |
| 6 parts | [2,2'-thio-bis-(4-tert.dodecyl-phenolate)]-diethanolamine Cu(II) |

Examples 36 and 37 illustrate the incorporation of the agent mixtures into a printing ink base.

Example 36

| | |
|---|---|
| 50 parts | ready printing varnish (viscosity 65 Pas) |
| 10 parts | blown linseed oil (viscosity 6 Pas) |
| 10 parts | barium sulphate |
| 12 parts | 2,2'-dihydroxy-4,4'-dimethoxy-benzophenone |
| 12 parts | 2-(2'-hydroxy-3'-tert.butyl-5'-methyl-phenyl)-5-chloro-benzotriazole |
| 3 parts | 1,1,3-tris-(2'-methyl-4'-hydroxy-5'-tert.butyl-phenyl)-butane |
| 3 parts | [2,2'-thio-bis-(4-tert.octyl-phenolate)]-cyclohexyl-diethanolamine Ni(II) |

The agents are made into a paste with the linseed oil and then milled in a bead-mill, together with the barium sulphate and the ready printing varnish, until a particle size of less than 4 μm has been attained. The finished printing paste, which is suitable particularly for the products, such as endless forms, is coated on a usual coating device or on the usual roller coater on to endless paper of 60 g/m$^2$ in a quantity of 0.5 g/m$^2$.

Example 37

Processing as printing ink

| | |
|---|---|
| 70 parts | ready printing varnish (viscosity 45 Pas) |
| 5 parts | blown linseed oil |
| 10 parts | 2-hydroxy-4-methoxy-benzophenone |
| 9 parts | 2-(2'-hydroxy-5'-methylphenyl)-benzotriazole |
| 6 parts | 2,4,6-tris-(3',5'-di-tert.butyl-4'-hydroxy-benzyl)-mesitylene |

The ingredients are mixed, milled and further processed as described in Example 36.

What we claim is:

1. Pressure-sensitive recording material having improved storability, lightfastness and heat resistance, which comprises a unit containing a dye precursor and a unit containing a dye acceptor material, which is capable of color formation by reaction with the dye precursor, characterized in that the dye acceptor material is an intimate mixture comprising (a) either (aa) a 2-hydroxy-benzophenone of formula I

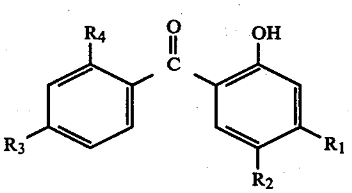
(I)

where $R_1$ is a hydroxy-group, an unsubstituted alkoxy residue with from 1 to 18 carbon atoms or an alkoxy residue with from 1 to 4 carbon atoms, carrying 1 or 2 hydroxy-groups, an alkoxy residue with from 1 to 4 carbon atoms, carrying 1 or 2 hydroxy groups and esterified with a saturated or olefinically unsaturated carboxylic acid with from 2 to 4 carbon atoms, $R_2$ is hydrogen, a phenyl residue, the sulphonic acid group $—SO_3H$ or the group $—SO_3Me$, Me being an alkali metal, $R_3$ is hydrogen, the hydroxy group, an alkyl group with from 1 to 12 carbon atoms, an alkoxy goup with from 1 to 18 carbon atoms or a phenyl residue, and $R_4$ is hydrogen, the hydroxy group, a phenyl residue, the carboxy-group —COOH or the group —COOMe, Me being an alkali metal;

or (bb) 3,5,7,3',4'-pentahydroxy-flavone of formula II

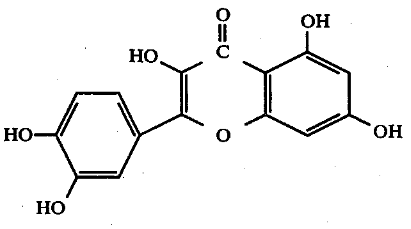
(II)

and (b) a substituted benzotriazole of formula III

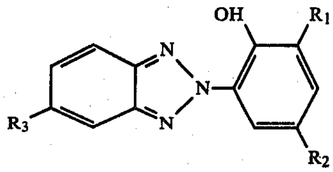
(III)

where $R_1$ is hydrogen or the tertiary butyl group, $R_2$ an alkyl residue with from 1 to 12 carbon atoms, an alkoxy residue with from 1 to 12 carbon atoms, the cyclohexyl residue, the sulphonic acid group $—SO_3H$ or the group $—SO_3Me$, Me being an alkali metal, and $R_3$ is hydrogen or chlorine.

2. Pressure-sensitive recording material according to claim 1, characterized in that the dye acceptor material, in addition, contains 2,4,6-tris-(3',5'-di-tert.butyl-4'-hydroxybenzyl)-mesitylene, 1,1,3-tris-(2'-methyl-4'-hydroxy-5'-tert.butyl-phenyl)-butane, octadecyl β-(3,5-di-tert.butyl-4-hydroxyphenyl)propionate, pentaerythritol β-(3,5-di-tert.butyl-4-hydroxyphenyl)propionate, or a 2-n-alkylthio-4,6-di-(3',5'-di-tert.butyl-4'-hydroxyphenoxy)-1,3,5-triazine, the alkylthio residue having from 4 to 12 carbon atoms and mixtures thereof.

3. Pressure-sensitive recording material according to claim 1, characterized in that the dye acceptor material, in addition, contains a compound of formula IV

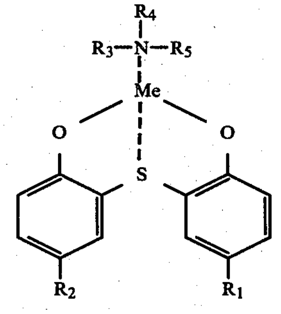
(IV)

where $R_1$ and $R_2$, which may be identical or different, are branched chain alkyl groups with from 6 to 12 carbon atoms, $R_3$ is an alkyl group with from 3 to 12 carbon atoms or a cyclo-aliphatic residue, in which case $R_4$ and $R_5$ then are hydrogen atoms, or one, two or three of the residues $R_3$, $R_4$ and $R_5$ are hydroxy-alkyl residues with from 2 to 6 carbon atoms, the other residues then being hydrogen atoms, and Me is Co, Ni, Mn, Zn, Fe, Cu, Cr or Va.

4. Pressure-sensitive recording material claim 2, characterized in that the dye acceptor material, in addition, contains a compound of formula IV

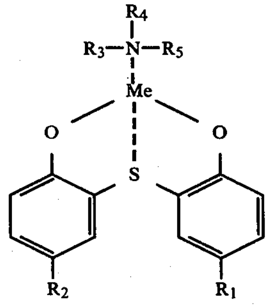
(IV)

where $R_1$ and $R_2$, which may be identical or different, are branched chain alkyl groups with from 6 to 12 carbon atoms, $R_3$ is an alkyl group with from 3 to 12 carbon atoms or a cyclo-aliphatic residue, in which case $R_4$ and $R_5$ then are hydrogen atoms, or one, two or three of the residues $R_3$, $R_4$ and $R_5$ are hydroxy-alkyl residues with from 2 to 6 carbon atoms, the other residues then being hydrogen atoms, and Me is Co, Ni, Mn, Zn, Fe, Cu, Cr or Va.

5. Pressure-sensitive recording material according to claim 1, characterized in that the dye acceptor material contains from 0.1 to 0.5% by weight of 5,10,11,11 α-tetrahydro-9,11-dihydroxy-8-methyl-5-oxo-1H-pyrrolo[2.1-c][1.4]-benzodiazepine-2-(trans)-acrylamide.

6. Pressure-sensitive recording material according to claim 2, characterized in that the dye acceptor material contains from 0.1 to 0.5% by weight of 5,10,11,11 α-tetrahydro-9,11-dihydroxy-8-methyl-5-oxo-1H-pyrrolo[2.1-c][1.4]-benzodiazepine-2-(trans)-acrylamide.

7. Pressure-sensitive recording material according to claim 3, characterized in that the dye acceptor material contains from 0.1 to 0.5% by weight of 5,10,11,11 α-tetrahydro-9,11-dihydroxy-8-methyl-5-oxo-1H-pyrrolo[2.1-c][1.4]-benzodiazepine-2-(trans)-acrylamide.

8. Pressure-sensitive recording material according to claim 4, characterized in that the dye acceptor material contains from 0.1 to 0.5% by weight of 5,10,11,11 α-tetrahydro-9,11-dihydroxy-8-methyl-5-oxo-1H-pyrrolo[2.1-c][1.4]-benzodiazepine-2-(trans)-acrylamide.

9. Pressure-sensitive recording material according to claim 1, characterized in that the dye acceptor material contains [1-phenyl-3-methyl-4-alkyl ether-pyrazolate(5)]Me complex salt, the alkyl ether residue being an alkoxy group with from 1 to 12 carbon atoms and Me being Co, Ni, Mn, Zn, Fe, Cu, Cr or Va.

10. Pressure-sensitive recording material according to claim 2, characterized in that the dye acceptor material contains [1-phenyl-3-methyl-4-alkyl ether-pyrazolate(5)]Me complex salt, the alkyl ether residue being an alkoxy group with from 1 to 12 carbon atoms and Me being Co, Ni, Mn, Zn, Fe, Cu, Cr or Va.

11. Pressure-sensitive recording material according to claim 3, characterized in that the dye acceptor material contains [1-phenyl-3-methyl-4-alkyl ether-pyrazolate(5)]Me complex salt, the alkyl ether residue being an alkoxy group with from 1 to 12 carbon atoms and Me being Co, Ni, Mn, Zn, Fe, Cu, Cr or Va.

12. Pressure-sensitive recording material according to claim 4, characterized in that the dye acceptor material contains [1-phenyl-3-methyl-4-alkyl ether-pyrazolate(5)]Me complex salt, the alkyl ether residue being an alkoxy group with from 1 to 12 carbon atoms and Me being Co, Ni, Mn, Zn, Fe, Cu, Cr or Va.

13. Pressure-sensitive recording material according to claim 5, characterized in that the dye acceptor material contains [1-phenyl-3-methyl-4-alkyl ether-pyrazolate(5)]Me complex salt, the alkyl ether residue being an alkoxy group with from 1 to 12 carbon atoms and Me being Co, Ni, Mn, Zn, Fe, Cu, Cr or Va.

14. Pressure-sensitive recording material according to claim 6, characterized in that the dye acceptor material contains [1-phenyl-3-methyl-4-alkyl ether-pyrazolate(5)]Me complex salt, the alkyl ether residue being an alkoxy group with from 1 to 12 carbon atoms and Me being Co, Ni, Mn, Zn, Fe, Cu, Cr or Va.

15. Pressure-sensitive recording material according to claim 7, characterized in that the dye acceptor material contains [1-phenyl-3-methyl-4-alkyl ether-pyrazolate(5)]Me complex salt, the alkyl ether residue being an alkoxy group with from 1 to 12 carbon atoms and Me being Co, Ni, Mn, Zn, Fe, Cu, Cr or Va.

16. Pressure-sensitive recording material according to claim 8, characterized in that the dye acceptor material contains [1-phenyl-3-methyl-4-alkyl ether-pyrazolate(5)]Me complex salt, the alkyl ether residue being an alkoxy group with from 1 to 12 carbon atoms and Me being Co, Ni, Mn, Zn, Fe, Cu, Cr or Va.

17. The pressure-sensitive recording material of claims 1, 2, 3, 4, 5, 6, 7, 8, 9, 10, 11, 12, 13, 14, 15 or 16, additionally comprising an inert wax binder.

18. For a pressure-sensitive recording material comprising a unit containing a dye precursor or its solution and a unit containing a dye acceptor material, which is capable of color formation by reaction with the dye precursor, a sheet-like, dye acceptor material containing unit consisting of a carrier material which is in sheet or web form, coated on one side with the dye acceptor material, characterized in that the dye acceptor material is an intimate mixture comprising (a) either (aa) a 2-hydroxy-benzophenone of formula I

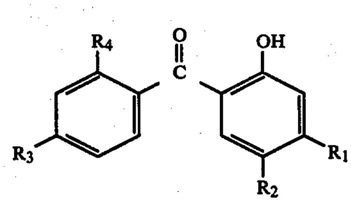

(I)

where $R_1$ is a hydroxy-group, an unsubstituted alkoxy residue with from 1 to 18 carbon atoms or an alkoxy residue with from 1 to 4 carbon atoms, carrying 1 or 2 hydroxy-groups, an alkoxy residue with from 1 to 4 carbon atoms, carrying 1 or 2 hydroxy groups and esterified with a saturated or olefinically unsaturated carboxylic acid with from 2 to 4 carbon atoms, $R_2$ is hydrogen, a phenyl residue, the sulphonic acid group $-SO_3H$ or the group $-SO_3Me$, Me being an alkali metal, $R_3$ is hydrogen, the hydroxy group, an alkyl group with from 1 to 12 carbon atoms, an alkoxy group with from 1 to 18 carbon atoms or a phenyl residue, and $R_4$ is hydrogen, the hydroxy group, a phenyl residue, the carboxy-group $-COOH$ or the group $-COOMe$, Me being an alkali metal;

or (bb) 3,5,7,3',4'-pentahydroxy-flavone of formula II

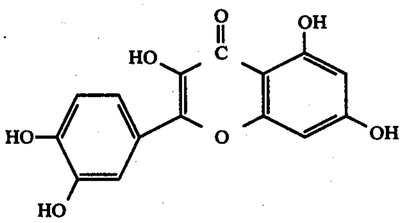

(II)

and (b) a substituted benzotriazole of formula III

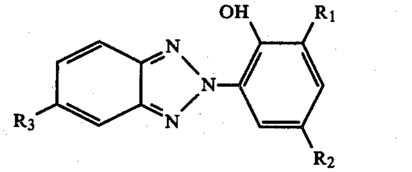

(III)

where $R_1$ is hydrogen or the tertiary butyl group, $R_2$ an alkyl residue with from 1 to 12 carbon atoms, an alkoxy residue with from 1 to 12 carbon atoms, the cyclohexyl residue, the sulphonic acid group $—SO_3H$ or the group $—SO_3Me$, Me being an alkali metal, and $R_3$ is hydrogen or chlorine.

19. A dye acceptor material containing sheet-like unit according to claim 18 for multi-copy precursor sensitive recording materials characterized in that the carrier material is coated on the one side with the dye acceptor material and on the other side with a dye precursor in usual manner.

20. A dye acceptor material containing sheet-like unit according to claim 18 for pressure-sensitive recording materials, characterized in that the dye acceptor material, in addition, contains 2,4,6-tris-(3′,5′-di-tert.butyl-4′-hydroxy-benzyl)mesitylene, 1,1,3-tris-(2′-methyl-4′-hydroxy-5′tert.butyl-phenyl)butane, octadecyl β-(3,5-di-tert.butyl-4-hydroxy-phenyl)propionate, pentaerythritol β-(3,5-di-tert.butyl-4-hydroxy-phenyl)propionate or a 2-n-alkylthio-4,6-di-(3′,5′-di-tert.butyl-4′-hydroxy-phenoxy)-1,3,5-triazine, the alkylthio residue having from 4 to 12 carbon atoms and mixtures thereof.

21. A dye acceptor material containing sheet-like unit according to claim 19 for pressure-sensitive recording materials, characterized in that the dye acceptor material, in addition, contains 2,4,6-tris-(3′,5′-di-tert.butyl-4′-hydroxy-benzyl)mesitylene, 1,1,3-tris(2′-methyl-4′-hydroxy-5′tert.butyl-phenyl)butane, octadecyl-(3,5-di-tert.butyl-4-hydroxy-phenyl)propionate, pentaerythritol-(3,5-di-tert.butyl-4-hydroxy-phenyl)propionate or a 2-n-alkylthio-4,6-di-(3′,5′-di-tert.butyl-4′-hydroxy-phenoxy)-1,3,5-triazine, the alkylthio residue having from 4 to 12 carbon atoms and mixtures thereof.

22. A dye acceptor material containing sheet-like unit according to claim 18 for pressure-sensitive recording materials characterized in that the dye acceptor material, in addition, contains a compound of formula IV

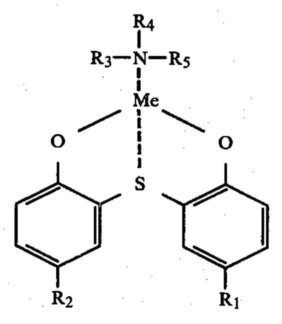

(IV)

where $R_1$ and $R_2$, which may be identical or different, are branched chain alkyl groups with from 6 to 12 carbon atoms, $R_3$ is an alkyl group with from 3 to 12 carbon atoms or a cyclo-aliphatic residue, in which case $R_4$ and $R_5$ then are hydrogen atoms, or one, two or three of the residues $R_3$, $R_4$ and $R_5$ are hydroxy-alkyl residues with from 2 to 6 carbon atoms, the other residues then being hydrogen atoms, and Me is Co, Ni, Mn, Zn, Fe, Cu, Cr or Va.

23. A dye acceptor material containing sheet-like unit according to claim 19 for pressure-sensitive recording materials characterized in that the dye acceptor material, in addition, contains a compound of formula IV

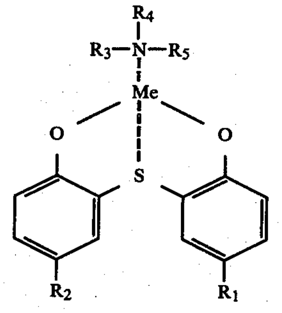

(IV)

where $R_1$ and $R_2$, which may be identical or different, are branched chain alkyl groups with from 6 to 12 carbon atoms, $R_3$ is an alkyl group with from 3 to 12 carbon atoms or a cyclo-aliphatic residue, in which case $R_4$ and $R_5$ then are hydrogen atoms, or one, two or three of the residues $R_3$, $R_4$ and $R_5$ are hydroxy-alkyl residues with from 2 to 6 carbon atoms, the other residues then being hydrogen atoms, and Me is Co, Ni, Mn, Zn, Fe, Cu, Cr or Va.

24. A dye acceptor material containing sheet-like unit according to claim 20 for pressure-sensitive recording materials characterized in that the dye acceptor material, in addition, contains a compound of formula IV

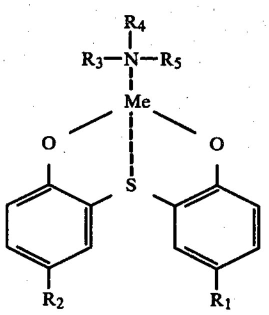

(IV)

where $R_1$ and $R_2$, which may be identical or different, are branched chain alkyl groups with from 6 to 12 carbon atoms, $R_3$ is an alkyl group with from 3 to 12 carbon atoms or a cyclo-aliphatic residue, in which case $R_4$ and $R_5$ then are hydrogen atoms, or one, two or three of the residues $R_3$, $R_4$ and $R_5$ are hydroxy-alkyl residues with from 2 to 6 carbon atoms, the other residues then being hydrogen atoms, and Me is Co, Ni, Mn, Zn, Fe, Cu, Cr or Va.

25. A dye acceptor material containing sheet-like unit according to claim 21 for pressure-sensitive recording materials characterized in that the dye acceptor material, in addition, contains a compound of formula IV (IV)

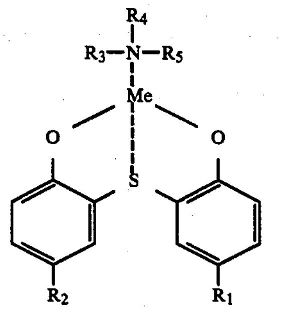

where $R_1$ and $R_2$, which may be identical or different, are branched chain alkyl groups with from 6 to 12 carbon atoms, $R_3$ is an alkyl group with from 3 to 12 carbon atoms or a cyclo-aliphatic residue, in which case $R_4$ and $R_5$ then are hydrogen atoms, or one, two or three of the residues $R_3$, $R_4$ and $R_5$ are hydroxy-alkyl residues with from 2 to 6 carbon atoms, the other residues then being hydrogen atoms, and Me is Co, Ni, Mn, Zn, Fe, Cu, Cr or Va.

26. A dye acceptor material containing sheet-like unit according to claim 18 for pressure-sensitive recording materials characterized in that the dye acceptor material contains from 0.1 to 0.5% by weight of 5,10,11,11α-tetrahydro-9,11-dihydroxy-8-methyl-5-oxo-1H-pyrrolo[2.1-c][1.4]-benzodiazepine-2-(trans)acrylamide.

27. A dye acceptor material containing sheet-like unit according to claim 19 for pressure-sensitive recording materials characterized in that the dye acceptor material contains from 0.1 to 0.5% by weight of 5,10,11,11α-tetrahydro-9,11-dihydroxy-8-methyl-5-oxo-1H-pyrrolo[2.1-c][1.4]-benzodiazepine-2-(trans)acrylamide.

28. A dye acceptor material containing sheet-like unit according to claim 20 for pressure-sensitive recording materials characterized in that the dye acceptor material contains from 0.1 to 0.5% by weight of 5,10,11,11α-tetrahydro-9,11-dihydroxy-8-methyl-5-oxo-1H-pyrrolo[2.1-c][1.4]-benzodiazepine-2-(trans)acrylamide.

29. A dye acceptor material containing sheet-like unit according to claim 21 for pressure-sensitive recording materials characterized in that the dye acceptor material contains from 0.1 to 0.5% by weight of 5,10,11,11α-tetrahydro-9,11-dihydroxy-8-methyl-5-oxo-1H-pyrrolo[2.1-c][1.4]-benzodiazepine-2-(trans)acrylamide.

30. A dye acceptor material containing sheet-like unit according to claim 22 for pressure-sensitive recording materials characterized in that the dye acceptor material contains from 0.1 to 0.5% by weight of 5,10,11,11α-tetrahydro-9,11-dihydroxy-8-methyl-5-oxo-1H-pyrrolo[2.1-c][1.4]-benzodiazepine-2-(trans)acrylamide.

31. A dye acceptor material containing sheet-like unit according to claim 23 for pressure-sensitive recording materials characterized in that the dye acceptor material contains from 0.1 to 0.5% by weight of 5,10,11,11α-tetrahydro-9,11-dihydroxy-8-methyl-5-oxo-1H-pyrrolo[2.1-c][1.4]-benzodiazepine-2-(trans)acrylamide.

32. A dye acceptor material containing sheet-like unit according to claim 24 for pressure-sensitive recording materials characterized in that the dye acceptor material contains from 0.1 to 0.5% by weight of 5,10,11,11α-tetrahydro-9,11-dihydroxy-8-methyl-5-oxo-1H-pyrrolo[2.1-c][1.4]-benzodiazepine-2-(trans)acrylamide.

33. A dye acceptor material containing sheet-like unit according to claim 25 for pressure-sensitive recording materials characterized in that the dye acceptor material contains from 0.1 to 0.5% by weight of 5,10,11,11α-tetrahydro-9,11-dihydroxy-8-methyl-5-oxo-1H-pyrrolo[2.1-c][1.4]-benzodiazepine-2-(trans)acrylamide.

34. A dye acceptor material containing sheet-like unit according to claim 18 for pressure-sensitive recording materials characterized in that the dye acceptor material contains [1-phenyl-3-methyl-4-alkyl ether-pyrazolate(5)]Me complex salt, the alkyl ether residue being an alkoxy group with from 1 to 12 carbon atoms and Me being Co, Ni, Mn, Zn, Fe, Cu, Cr or Va.

35. A dye acceptor material containing sheet-like unit according to claim 19 for pressure-sensitive recording materials characterized in that the dye acceptor material contains [1-phenyl-3-methyl-4-alkyl ether-pyrazolate(5)]Me complex salt, the alkyl ether residue being an alkoxy group with from 1 to 12 carbon atoms and Me being Co, Ni, Mn, Zn, Fe, Cu, Cr or Va.

36. A dye acceptor material containing sheet-like unit according to claim 20 for pressure-sensitive recording materials characterized in that the dye acceptor material contains [1-phenyl-3-methyl-4-alkyl ether-pyrazolate(5)]Me complex salt, the alkyl ether residue being an alkoxy group with from 1 to 12 carbon atoms and Me being Co, Ni, Mn, Zn, Fe, Cu, Cr or Va.

37. A dye acceptor material containing sheet-like unit according to claim 21 for pressure-sensitive recording materials characterized in that the dye acceptor material contains [1-phenyl-3-methyl-4-alkyl ether-pyrazolate(5)]Me complex salt, the alkyl ether residue being an alkoxy group with from 1 to 12 carbon atoms and Me being Co, Ni, Mn, Zn, Fe, Cu, Cr or Va.

38. A dye acceptor material containing sheet-like unit according to claim 22 for pressure-sensitive recording materials characterized in that the dye acceptor material contains [1-phenyl-3-methyl-4-alkyl ether-pyrazolate(5)]Me complex salt, the alkyl ether residue being an alkoxy group with from 1 to 12 carbon atoms and Me being Co, Ni, Mn, Zn, Fe, Cu, Cr or Va.

39. A dye acceptor material containing sheet-like unit according to claim 23 for pressure-sensitive recording materials characterized in that the dye acceptor material contains [1-phenyl-3-methyl-4-alkyl ether-pyrazolate(5)]Me complex salt, the alkyl ether residue being an alkoxy group with from 1 to 12 carbon atoms and Me being Co, Ni, Mn, Zn, Fe, Cu, Cr or Va.

40. A dye acceptor material containing sheet-like unit according to claim 24 for pressure-sensitive recording materials characterized in that the dye acceptor material contains [1-phenyl-3-methyl-4-alkyl ether-pyrazolate(5)]Me complex salt, the alkyl ether residue being an alkoxy group with from 1 to 12 carbon atoms and Me being Co, Ni, Mn, Zn, Fe, Cu, Cr or Va.

41. A dye acceptor material containing sheet-like unit according to claim 25 for pressure-sensitive recording materials characterized in that the dye acceptor material contains [1-phenyl-3-methyl-4-alkyl ether-pyrazolate(5)]Me complex salt, the alkyl ether residue being an alkoxy group with from 1 to 12 carbon atoms and Me being Co, Ni, Mn, Zn, Fe, Cu, Cr or Va.

42. A dye acceptor material containing sheet-like unit according to claim 26 for pressure-sensitive recording materials characterized in that the dye acceptor material contains [1-phenyl-3-methyl-4-alkyl ether-pyrazolate(5)]Me complex salt, the alkyl ether residue being an alkoxy group with from 1 to 12 carbon atoms and Me being Co, Ni, Mn, Zn, Fe, Cu, Cr or Va.

43. A dye acceptor material containing sheet-like unit according to claim 27 for pressure-sensitive recording materials characterized in that the dye acceptor material contains [1-phenyl-3-methyl-4-alkyl ether-pyrazolate(5)]Me complex salt, the alkyl ether residue being an alkoxy group with from 1 to 12 carbon atoms and Me being Co, Ni, Mn, Zn, Fe, Cu, Cr or Va.

44. A dye acceptor material containing sheet-like unit according to claim 28 for pressure-sensitive recording materials characterized in that the dye acceptor material contains [1-phenyl-3-methyl-4-alkyl ether-pyrazolate(5)]Me complex salt, the alkyl ether residue being an alkoxy group with from 1 to 12 carbon atoms and Me being Co, Ni, Mn, Zn, Fe, Cu, Cr or Va.

45. A dye acceptor material containing sheet-like unit according to claim 29 for pressure-sensitive recording materials characterized in that the dye acceptor material contains [1-phenyl-3-methyl-4-alkyl ether-pyrazolate(5)]Me complex salt, the alkyl ether residue being an alkoxy group with from 1 to 12 carbon atoms and Me being Co, Ni, Mn, Zn, Fe, Cu, Cr or Va.

46. A dye acceptor material containing sheet-like unit according to claim 30 for pressure-sensitive recording materials characterized in that the dye acceptor material contains [1-phenyl-3-methyl-4-alkyl ether-pyrazolate(5)]Me complex salt, the alkyl ether residue being an alkoxy group with from 1 to 12 carbon atoms and Me being Co, Ni, Mn, Zn, Fe, Cu, Cr or Va.

47. A dye acceptor material containing sheet-like unit according to claim 31 for pressure-sensitive recording materials characterized in that the dye acceptor material contains [1-phenyl-3-methyl-4-alkyl ether-pyrazolate(5)]Me complex salt, the alkyl ether residue being an alkoxy group with from 1 to 12 carbon atoms and Me being Co, Ni, Mn, Zn, Fe, C, Cr or Va.

48. A dye acceptor material containing sheet-like unit according to claim 32 for pressure-sensitive recording materials characterized in that the dye acceptor material contains [1-phenyl-3-methyl-4-alkyl ether-pyrazolate(5)]Me complex salt, the alkyl ether residue being an alkoxy group with from 1 to 12 carbon atoms and Me being Co, Ni, Mn, Zn, Fe, Cu, Cr or Va.

49. A dye acceptor material containing sheet-like unit according to claim 33 for pressure-sensitive recording materials characterized in that the dye acceptor material contains [1-phenyl-3-methyl-4-alkyl ether-pyrazolate(5)]Me complex salt, the alkyl ether residue being an alkoxy group with from 1 to 12 carbon atoms and Me being Co, Ni, Mn, Zn, Fe, Cu, Cr or Va.

50. A dye acceptor material containing sheet-like unit according to claim 18 for pressure-sensitive recording materials characterized in that the dye acceptor material is coated on the carrier material in a quantity of from 0.5 to 6 $g/m^2$ of the carrier material.

51. The pressure-sensitive recording material of claims 18, 19, 20, 21, 22, 23, 24, 25, 26, 27, 28, 29, 30, 31, 32, 33, 34, 35, 36, 37, 38, 39, 40, 41, 42, 43, 44, 45, 46 47, 48, 49 or 50, additionally comprising an inert wax binder.

* * * * *